United States Patent [19]

Graham

[11] 4,048,103

[45] Sept. 13, 1977

[54] COMPOSITION BASED ON PHENOLIC RESIN, POLYISOCYANATE, AND PETROLEUM OIL

[75] Inventor: Joseph Graham, Woodbury, Minn.

[73] Assignee: Minnesota Mining and Manufacturing Company, St. Paul, Minn.

[21] Appl. No.: 656,536

[22] Filed: Feb. 9, 1976

[51] Int. Cl.$^2$ .............................................. C08J 9/00
[52] U.S. Cl. .......................... 260/2.5 B; 260/29.2 TN; 260/33.6 UB; 260/37 N; 427/140; 427/393; 428/425
[58] Field of Search ................. 260/33.6 UB, 2.5 AE, 260/2.5 AF, 2.5 AR, 29.2 TN; 428/425

[56] References Cited

U.S. PATENT DOCUMENTS

| 3,242,107 | 3/1966 | Bunge et al. ............. 260/33.6 UB X |
| 3,390,119 | 6/1968 | Alexander et al. ....... 260/2.5 AK X |
| 3,585,157 | 6/1971 | Beck .............................. 260/2.5 AK |
| 3,676,392 | 7/1972 | Robins ................................... 260/38 |

*Primary Examiner*—Lewis T. Jacobs
*Attorney, Agent, or Firm*—Cruzan Alexander; Donald M. Sell; Roger R. Tamte

[57] ABSTRACT

Curable compositions comprising phenolic resin, polyisocyanate, catalyst, and petroleum oil. The phenolic resin is soluble in the petroleum oil, but during reaction of the ingredients the petroleum oil separates as a uniform dispersion of minute droplets entrapped within the reaction product. The compositions are insensitive to the presence of water and produce dimensionally stable cured products, making them especially useful as wood-patching compositions.

29 Claims, 3 Drawing Figures

COMPOSITION BASED ON PHENOLIC RESIN, POLYISOCYANATE, AND PETROLEUM OIL

BACKGROUND OF THE INVENTION

The present invention arises out of a need for improved materials to patch defects in wood, e.g., to fill knotholes, voids, splits and other defective areas in plywood veneers. Polyurethane compositions have been the most commonly used patching material, but they have important limitations. For one, the polyisocyanate in such compositions reacts with the water present in wood products, causing foaming that weakens the bond between a patch and the adjacent wood; reaction with water can be minimized by the use of certain metal-based catalysts, but the potential toxicity of such catalysts has limited their use. Secondly, conventional polyurethane wood-patching compositions degrade under the high temperatures used in laminating phenolic-saturated papers to plywood to provide decorative or weather- and chemical-resistant surfaces; temperatures of 275° to 300° F (135°-150° C) are applied for 5-10 minutes in such "overlay" procedures, and such conditions degrade existing polyurethane materials and leave a weak bond between the overlay and patched area.

Rapid-curing materials based on polyesters and epoxies have also been used to patch or fill wood, but those materials exhibit other disadvantages. A principal disadvantage is that their curing reaction is highly exothermic. The result is thermal degradation, discoloration, bubbling, and undesired shrinkage and cracking of the filled area, with a consequent loss of physical properties.

The opportunities for patching wood products would be greatly expanded by the availability of new materials that avoid the above deficiencies, as well as exhibit other properties needed in wood patching. Such properties include applicability by mass production techniques and formation of dimensionally stable weather-resistant patches that can be cut, shaped, sanded, adhered, nailed, and finished as wood products. Insofar as known, materials that both avoid the above deficiencies and exhibit the desired properties have been unavailable until the present invention.

SUMMARY OF THE INVENTION

In brief summary, compositions of the invention comprise (a) an oil-soluble phenolic resin; (b) polyisocyanate averaging at least two isocyanate groups per molecule capable of reacting with hydroxyl groups on said phenolic resin to form a cured reaction product; (c) a catalyst that promotes reaction between said isocyanate and hydroxyl groups; and (d) petroleum oil in an amount sufficient to dissolve the phenolic resin, polyisocyanate, and catalyst. A special aspect of the compositions is the solubility or compatibility relationship between the petroleum oil and the other ingredients: as noted, the phenolic resin, polyisocyanate, and catalyst are initially soluble in the petroleum oil; but as reaction proceeds, the petroleum oil separates from the reaction product as a uniform dispersion of discrete droplets entrapped within the reaction product. A number of important properties result from this separation of the petroleum oil.

One key property exhibited by compositions of the invention is a moisture-insensitivity that is amazing to persons acquainted with the normal reactivity between isocyanate and water. Compositions of the invention cannot only be used to patch wood products—including sheets of plywood veneer as well as deeper voids in lumber—without foaming occuring in the patch, but they can in fact be extended with large volumes of water, e.g., 50 volume-percent, without causing foaming. The full explanation for this water-insensitivity is not known, through it is thought to relate to the hydrophobic nature of the petroleum oil, in which the isocyanate and phenolic resins are dissolved, and to the separation of the petroleum oil into despersed droplets as reaction proceeds; the isocyanate and phenolic resin apparently react within the petroleum oil, where the isocyanate is insulated from the water.

Whatever the explanation, extendibility with water is an exciting advantage of the new compositions. It greatly lowers the cost of using the materials, and it adds to their beneficial properties. For example, the presence of water further improves the machinability and receptivity to paints and stains of cured products of the invention (machinability is improved over prior art polyurethane compositions even in non-water-extended compositions of the invention because of the despersion of petroleum oil within the composition).

Another especially desirable attribute of compositions of the invention is the low amount of heat generated during reaction of the compositions. This low amount of heat is in contrast to the high amount of heat generated during conventional catalyzed reactions between polyisocyanates and polyols. Apparently the dispersed petroleum oil provides a heat sink that controls the buildup of heat within the system. The reduction in heat is sufficient to permit preparation of thick castings, e.g., 25 centimeters or more, without degradation. Besides its utility to reduce heat buildup during reaction, the heat sink is also useful to control heat buildup during machining or use of compositions of the invention.

Other useful properties include excellent dimensional stability, both during reaction and later upon exposure to various environments; resistance to high temperatures (permitting use of compositions of the invention in overlay work as described above); short curing times; adaptability to B-stage curing procedures; internal lubricity; and low cost available by use of petroleum oils as a diluent.

The described properties especially adapt compositions of the invention to use in wood patching applications. Other potentially important uses for compositions of the invention include use as fabricating resins, e.g., coating, casting, and molding compositions (compositions of the invention can be used even in liquid injection molding operations because of the short in-mold time made possible by their rapid-setting nature); as plastic machine stock; as adhesives and sealants; and as sheets or films (sheets of compositions of the invention can be readily B-staged to a tack-free state, then embossed with a wood grain or other pattern, and then fully cured; cured dimensionally stable stain-receptive polymeric sheets made in this way are novel products useful in ways not suggested or available in the prior art).

BACKGROUND PRIOR ART

A number of patents issued to Robins, e.g., U.S. Pat. Nos. 3,409,579; 3,426,831; 3,429,848; 3,423,457; and 3,676,392 teach compositions based on phenolic resin and polyisocyanate as a binder for sand or other aggregate in the manufacture of foundry cores. These compositions are distinct from compositions of the present invention both in composition and properties: the compositions taught in the patents are diluted with blends of polar, aromatic, and volatile solvents, rather than petroleum oils; and these solvents are specifically chosen to provide compatibility with the other ingredients of the composition, which contrasts with the incompatibility between petroleum oil and reaction product sought in compositions of the present invention. The compositions of the patents do not exhibit or suggest the possibility of the moisture-insensitivity, control of heat buildup, internal lubricity as well as other desirable properties exhibited by compositions of the invention, and the compositions of the patents are not useful in the same way as compositions of the invention.

A different kind of prior art is represented by a series of patents to Olstowski et al., e.g., U.S. Pat. Nos. 3,886,182; 3,879,329; 3,883,465; 3,883,466; 3,883,484; 3,892,705; 3,907,739; and 3,917,571. These patents describe compositions that comprise a polyol, a polyisocyanate, a catalyst and a liquid modifier compound such as a cyclic ether or polyether, ester of carboxylic acid, organic carbonate, linear or cyclic sulfone, etc. Literature advertising molding compounds apparently made under these patents ("Instant Set Polymer" from Dow Chemical Company) indicates that a phasing out of the modifier compound occurs as reaction proceeds, and the phased-out droplets of modifier are said to serve as a heat sink to control heat buildup during the mixing and molding cycle. Compositions of the invention are distinct from the described compositions and are not suggested by the listed patents. For example, the patents do not suggest the use of phenolic resin, do not suggest the use of petroleum oil as a diluent, and do not predict the phase separation that occurs between petroleum oil and the reaction product of compositions of the invention. Since these differences lead to important functional differences, including the described water-insensitivity and low cost, compositions of the invention offer an important advance over the teachings of the listed patents.

DETAILED DESCRIPTION

Phenolic resins are commercially available in wide variety, and different ones may be selected for use in the present invention depending on the final end use to be made of the composition (the term "phenolic resin" as used in the art and in this specification means a polymeric condensation product obtained by the reaction of phenol and aldehyde). As a general characterization, the phenolic resins used in compositions of the invention are reactive with polyisocyanates to form a cured product; are soluble in the petroleum oil used in the composition, and thus are "oil-soluble" for purposes herein; and form a reaction product with polyisocyanate from which the petroleum oil separates as minute or colloidal droplets.

Best results at obtaining the desired phase separation have been obtained with phenolic resins prepared from alkyl-substituted phenols. Generally at least two positions on the phenol molecule, selected from ortho and para positions, are not substituted, and reaction with aldehyde occurs at these positions to form a polymeric structure. The alkyl substituent generally contains 10 carbons or less, and preferably contains 4 carbons. Representative alkyl-substituted phenols are p-butyl phenol, p-amyl phenol, p-cyclohexyl phenol, p-octyl phenol, and cashew nut phenol.

The most preferred phenolic resins are those made from phenol substituted in the para position with tertiary alkyl, and of these the most preferred is phenolic resin based on para-tertiary-butylphenol. Compositions of the invention in which at least a weight majority of the phenolic resin is made from such phenols exhibit minimal shrinkage and weight loss after curing of the composition. Even in preferred compositions of the invention, a portion of the phenolic resin, preferably less than about 20 weight-percent, may be based on unsubstituted phenols.

Phenolic resins used in the present invention are typically prepared under conditions such that at least the bulk of the resin has methylene ether linkages. Such polymers have repeating units represented by the following formula:

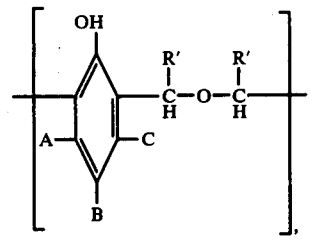

where A, B, and C are individually hydrogen or hydrocarbon radical and R' is hydrogen or a hydrocarbon radical. Most often R' is hydrogen, since the most common aldehyde used in preparing phenolic resins is formaldehyde; but other aldehydes, generally of less than 8 carbon atoms, are also useful.

Preferably the phenolic resins are of the novolac type because of the superior shelf-stability of compositions using such a novolac resin, but resole resins can also be used. As taught in the art, novolac resins are permanently soluble, fusible resins prepared by reacting mixtures that contain less than one mole of aldehyde per mole of phenol, while resole and resitole resins are thermosetting "one-step" resins having pendant methylol groups prepared by appropriately reacting mixtures that contain at least one mole of aldehyde per mole of phenol. Resole resins are in the A-stage, while resitole resins are of higher molecular weight, higher viscosity, and some crosslinking.

In general, the isocyanate compound in compositions of the invention can be aliphatic, cycloaliphatic or aromatic compound having on the average at least two isocyanate groups per molecule. Aromatic polyisocyanates are preferred, and polymeric varieties such as diphenylmethanediisocyanate, triphenylmethanetriisocyanate and mixtures thereof, are especially preferred because of their low volatility. In addition, polyisocyanates in "prepolymer" form prepared by reacting an excess of polyisocyanate with a polyhydric alcohol such as polypropylene glycol can be employed.

Sufficient isocyanate compound is included in compositions of the invention to obtain substantially complete reaction of hydroxyl groups and isocyanate groups. Generally this requires somewhat of an excess of isocyanate groups, apparently because isocyanate compound may be dissolved in or contained in the colloidal droplets of oil separated from the reaction product. In numerical terms the ratio of isocyanate groups to hydroxyl groups in compositions of the invention will generally be in the range between about 0.8:1 and 3:1, preferably between about 1.5:1 and 2:1.

Petroleum oils used in the invention exhibit the previously described ability to dissolve the phenolic resin of the composition and separate from the reaction product of the phenolic resin and polyisocyanate. Petroleum oils are generally complex blends of compounds, quite largely hydrocarbons, obtained by separation and purification of crude oil. For the most part, they comprise high-boiling fractions, i.e., at least 50 weight-percent of the petroleum oil comprises compounds of $C_{12}$ or higher which have a distillation temperature in excess of 275° C. As a result they have a lubricity and viscosity not exhibited by lower fractions of crude oil; such lower fractions may be present in petroleum oils, but the majority of a petroleum oil constitutes higher fractions.

Petroleum oils generally include both paraffinic ingredients (saturated hydrocarbons which may be straight-chain or branched) and aromatic ingredients; and the relative proportion of paraffinic and aromatic ingredients influences the extent of compatibility of the petroleum oil with other materials such as phenolic resins. Best results in compositions of the invention have been obtained when the aromatic content in the petroleum oil is between about 40 and 90 weight-percent. However, the optimum ratio will depend on the particular phenolic resin and other ingredients being used in the compositions. The desired balance between solubility and phase-out can be tested by adding a proposed mixture of phenolic resin, polyisocyanate and catalyst to a candidate petroleum oil and observing whether phase-out or separation, as represented by an opacification of the mixture, occurs during the resulting reaction.

Petroleum oils generally include only very small percentages of elements such as nitrogen, sulfur, or oxygen, and therefore they are generally regarded as nonpolar. Polar diluents can be included in compositions of the invention either in commercial modified petroleum fractions or by addition of polar compounds to the petroleum oil. The amount of such added polar ingredients will depend on the particular phenolic resin and polyisocyanate used, and the degree of compatibility the overall diluent has with the other ingredients as a result of addition of such a polar ingredient, but in most cases the added polar ingredient will account for less than 20 weight-percent, and preferably less than 10 weight-percent, of a composition of the invention. Typical polar compounds that may be added to a composition of the invention are plasticizers such as dioctylphthalate and synthetic oils such as polyester lubricants prepared from polyhydric alcohols and organic acids.

Sufficient petroleum oil is included to dissolve the phenolic resin, polyisocyanate and catalyst and leave the composition in flowable form, i.e., so that it will flow at least under the pressure of a spreading or application tool into a recessed area of a wood product. Preferably the diluent organic ingredients (i.e., petroleum oil and any other liquid organic ingredients that are nonreactive in the system) will account for at least 50 weight-percent of the oganic ingredients in the composition, in order to achieve a desired viscosity. To avoid excessive oiliness of the reacted composition in the diluent organic ingredients will preferably account for less than about 80 weight-percent of the organic ingredients.

A variety of catalysts known to promote the reaction of isocyanate and hydroxyl groups may be included in compositions of the invention to provide rapid cure. Preferred catalysts are tertiary amine catalysts such as triethylamine, N,N-dimethylcyclohexylamine, etc. Metal ion catalysts such as phenylmercury acetate, zinc naphthenate, stannous octoate, may also be used. The catalysts are used in typical catalytic amounts sufficient to obtain the desired time of reaction. Most often the catalyst is mixed directly in one of the parts of the composition but it may also be applied subsequent to deposition of the composition on a work surface. For example, tertiary amine in a gaseous form may be applied to compositions of the invention after they have been deposited onto a substrate.

Compositions of the invention are generally packaged in two parts and then mixed at the time of use. For ease of mixing at least part of the petroleum oil is typically included with the phenolic resin so as to dissolve that resin. Reaction typically proceeds rapidly, with curing times of 1—3 minutes, and geneally under 5 minutes, with preferred catalysts.

When water is used as an extending agent, it is usually added to the composition at the time of mixing, whereupon it becomes dispersed into the composition. To prolong its emulsified form, surfactants may be used. The amount of water used will depend on the nature of properties desired in the cured product, such as strength and machinability, but for use to extend the composition, water will generally be added in an amount that constitutes at least 5 or 10 weight-percent of the composition. For some applications, 50 weight-percent of the composition is water; more may be used for some purposes, but for patching wood 30 weight-percent or less is preferred.

Solid extenders or fillers, such as wood flour, clay, calcium carbonate, sand, or other inorganic materials, can also be used. Hollow fillers such as glass or synthetic polymeric hollow microspheres are especially useful to provide low-density materials of desired physical characteristics. Hollow microspheres, generally included in amounts that account for 10 to 40 or 50 volume-percent of the complete composition, are especially useful in materials used to fill wood because they contribute to wood-like properties in the cured resin. Pigments may be used to provide desired coloration.

The drawing illustrates representative cured products of the invention.

Figure 1:
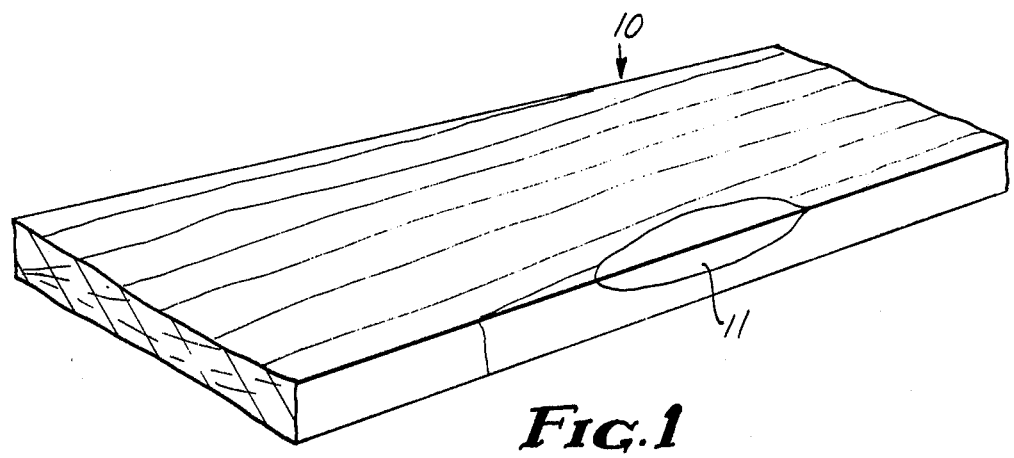
FIG. 1 shows a piece of lumber 10 having a patch 11 that comprises a cured composition of the invention.
Figure 2:
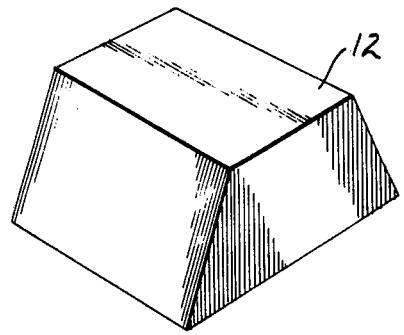
FIG. 2 shows a molded product 12, i.e., a product having the shape of a mold in which it is formed, comprising a composition of the invention.
Figure 3:
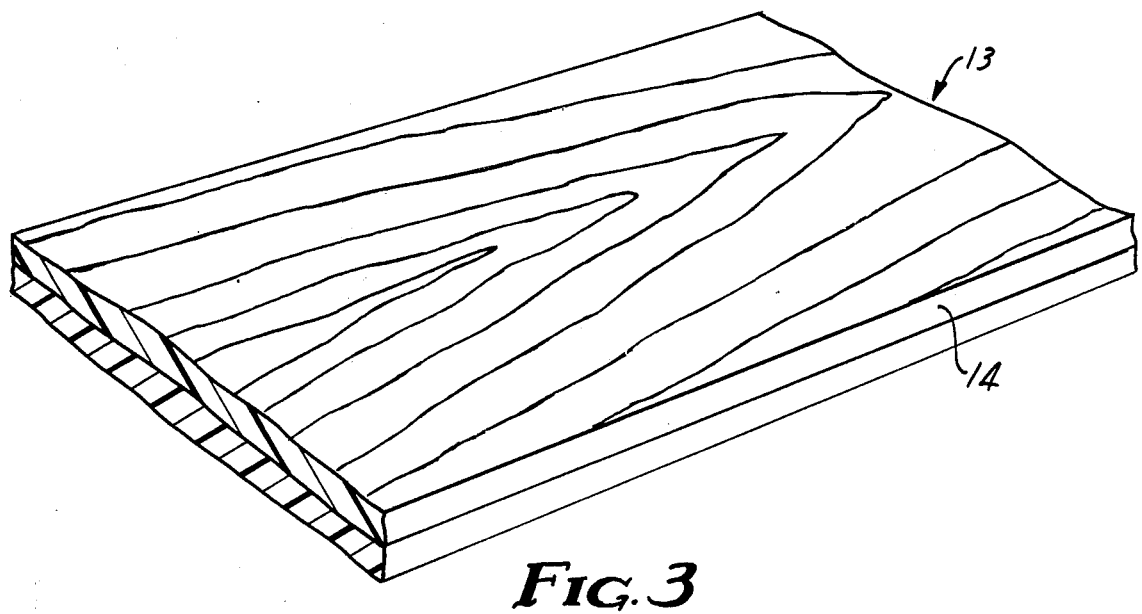

And FIG. 3 shows a sheet product 13, in this case embossed with a wood grain, comprising a layer 14 of cured composition of the invention.

The invention will be further illustrated by the following examples (amounts and percentages are in weight unless otherwise indicated):

EXAMPLES 1-4

Alkyl-substituted phenol in the kind and amount listed in Table I was placed together with 145 grams of paraformaldehyde, 3 grams of sodium hydroxide, and 240 grams of water in a 2-liter reaction flask. The flask was sealed and the contents heated to 100° C, and then under reflux conditions for 1 hour. At this time as much as possible of the aqueous (top) layer was decanted off. The composition was neutralized with dilute hydrochloric acid, washed again with hot water, and the flask connected via condenser and receiving flask to a vacuum pump. Dehydration was continued until the temperature in the mixture reached 250° F (120° C), after which the resin was allowed to cool to 200° F (93° C) and drained.

Thirty parts by weight of the resulting polymer were dissolved in 30 parts of Kenplast G (petroleum oil commercially available from Kenrich Petrochemicals, Inc. and consisting of 96.2% aromatic oil and 3.8% paraffinic oil) and 40 parts of Shellflex 293 (petroleum oil commercially available from Shell Chemical Co. and consisting of 45.0% aromatic oil, 52.8% paraffinic oil and 2.2% other). To this solution was added 0.3 part of N,N-dimethylcyclohexylamine catalyst and 30 parts of diphenylmethanediisocyanate, triphenylmethanetriisocyanate and mixtures thereof (Mondur MRS commercially available from Mobay Chemical Company, Division of Baychem Corp., Pittsburg, Pa.). The resulting solution was mixed until uniform and then poured into a ½ by ¼ by 6 inch (1.25 by 0.6 by 15 centimeters) silicone mold. As reaction proceeded, in 1-3 minutes, the oil phased out to form first a cloudy appearing liquid and then an opaque solid. The oil remainded entrapped within the cured product so that there was no surface oiliness. The cured samples were then aged at 125° F (52° C) for 24 hours and 275° F (135° C) for 10 minutes, and the percent shrinkage (or expansion) and weight loss were determined. The results are reported in Table I.

TABLE I

EFFECT OF CHAIN LENGTH OF PARA-ALKYL-SUBSTITUTED PHENOLIC RESINS ON MAKING NON-SHRINKING URETHANES

| Ex. | Phenolic | Amount | Percent Weight Loss | | Percent Shrinkage (Expansion) | |
|---|---|---|---|---|---|---|
| No. | Resin | (grams) | 24 Hr. | 10 Min. | 25 Hr. | 10 Min. |
| 1 | p-t-butyl phenol | 300 | 0.41 | 0.41 | 0 | 0 |
| 2 | p-t-amyl phenol | 330 | 1.1 | 1.8 | .78 | 0 |
| 3 | p-t-octyl phenol | 412 | 1.2 | 1.7 | (.78) | (1.8) |
| 4 | p-t-nonyl phenol | 441 | 3.3 | 4.5 | 0 | (7.8) |

EXAMPLE 5

The procedure of Example 1 was followed to make an oil-soluble phenolic resin using 600 grams of cashew nut liquid phenol, 145 grams of paraformaldehyde, 3 grams sodium hydroxide, and 240 grams of water. Cashew nut phenol contains in the meta position a 15-carbon straight-chain hydrocarbyl radical containing generally 1 to 3 non-conjugated carbon—carbon double bonds. The major component is a monohydroxyl compound, metapentadecenylphenol, and a minor amount of 3-hydroxyl, 5-pentadecenylphenol. This phenol is commercially available in more or less pure state as cashew nut shell liquid.

Thirty parts by weight of the resulting polymer were dissolved in 70 parts of Shellflex 293 oil. To this solution was added 0.3 part of N,N-dimethylcyclohexylamine catalyst and 30 parts of Mondur MRS. The resulting solution was mixed until uniform and then poured into a silicone mold. The cured opaque product was inspected by running a clean white cloth over the surface to check for oiliness, and dimensional stability was measured by exposing the sample to temperatures of 125° F (52° C) for 24 hours (no change observed) and 275° F (135° C) for 10 minutes (2 percent expansion).

EXAMPLES 6–10

Thirty parts of a commercially available (Union Carbide CKR 1634) oil-soluble phenolic resin obtained from para-t-butyl phenol and formaldehyde were dissolved in 70 parts of petroleum oil obtained by mixing different amounts of Kenplast G and Shellflex 293 to obtain different ratios of aromatic and paraffinic oils. To this solution was added 0.3 part of N,N-dimethylcyclohexylamine catalyst and 30 parts of Mondur MRS. The resulting solution was mixed until uniform and then poured into the described silicone mold. The cured opaque product was inspected for oiliness and tested, with results reported in Table II. With these particular compositions, aromatic contents of 50–80 weight-percent of the petroleum oil, have proved best. At two combinations of paraffin and aromatic content, the amounts of weight loss and shrinkage were regarded as unacceptable for presently contemplated purposes, and these combinations are reported as Comparative Examples 1 and 2.

TABLE II

| Example No. | Percent Paraffin | Percent Aromatic | Surface Oiliness | Percent Weight Loss | | Percent Shrinkage (Expansion) | |
|---|---|---|---|---|---|---|---|
| | | | | 125° F 24 Hrs. | 275° F 10 Min. | 125° F 24 Hrs. | 275° F 10 Min. |
| 6 | 17.8 | 81.6 | None | 1.4 | 2.0 | .78 | .78 |
| 7 | 24.8 | 74.2 | None | 0.41 | 0.41 | 0 | 0 |
| 8 | 31.8 | 66.9 | None | 0.33 | 0.33 | 0 | 0 |
| 9 | 38.8 | 59.6 | None | 0.75 | 0.99 | 0 | 0 |
| 10 | 45.8 | 52.3 | Oily | 6.5 | 12.1 | 0 | (.26) |
| Comparative Example 1 | 3.8 | 96.2 | None | 6.9 | 9.5 | 3.1 | 4.7 |
| Comparative Example 2 | 8.1 | 88.8 | None | 6.1 | 8.0 | 1.8 | 3.4 |

EXAMPLE 11

Thirty parts of the phenolic resin used in Example 6 were dissolved in a mixture of 40 parts Kenplast G oil and 30 parts Shellflex 293 oil. To this solution was added 1 percent by weight of water and 0.3 part N,N-dimethylcyclohexylamine catalyst, and the ingredients mixed until uniform. Thereupon, 30 parts of Mondur MRS was added and the ingredients again mixed until uniform. The mixture was poured into a 50-ml graduated cylinder to the 30 ml level and allowed to cure, after which the foam rise was measured.

This procedure was repeated two more times, but with the amount of water increased to 10 percent and 40 percent, respectively.

As a comparison, the same procedure was followed except that the Shellflex 293 oil was replaced with equal amounts of polar solvents as reported in Table III.

TABLE III

| Example No. | Polar Solvent or Oil | Foam Rise Caused By Different Amounts of Water | | |
|---|---|---|---|---|
| | | 1 percent H₂O (percent) | 10 percent H₂O (percent) | 40 percent H₂O (percent) |
| 11 Comparative | Shellflex 293 | 0 | 0 | 0 |
| Example 3 Comparative | Furaldehyde | 63 | — | — |
| Example 4 COmparative | Furfuryl Alcohol Cellosolve | 97 | — | — |
| Example 5 Comparative | Acetate Diacetone | 3.5 | 40 | — |
| Example 6 Comparative | Alcohol | 29 | — | — |
| Example 7 | TP 740 Polyol (Commercially available from Wyandotte Chemical Corp.) | 150 | — | — |

EXAMPLE 12-18

Thirty parts of the phenolic resin used in Example 6 were dissolved in a mixture of 30 parts Kenplast G oil and 40 parts Shellflex 293 oil. To this solution were added 0.3 part of N,N-dimethylcyclohexylamine catalyst and different amounts of Mondur MRS, producing isocyanate/hydroxyl ratios as repoted in Table IV. The resulting solution was mixed until uniform and then poured into a 1.25 centimeter by 0.6 centimeter by 15 centimeter silicone mold. Surface oiliness and percent shrinkage and weight loss in the cured opaque product were measured, with results as reported in Table IV.

TABLE IV
DEPENDENCE OF ISOCYANATE CONTENT ON MAKING NON-SHRINKING RESINS

| Ex. No. | Amt. of Mondur MRS | NCO/OH Ratio | Surface Oiliness | Percent Weight Loss | | Percent Shrinkage (Expansion) | |
|---|---|---|---|---|---|---|---|
| | | | | 125° F 24 Hrs. | 275° F 10 Min. | 125° F 24 Hrs. | 275° F 10 Min. |
| 12 | 20 | 0.96 | Very Slightly | 0.46 | 3.7 | 0 | (.25) |
| 13 | 25 | 1.20 | None | 0.12 | 1.2 | 0 | (.78) |
| 14 | 35 | 1.68 | None | 0.25 | 1.4 | 0 | (.52) |
| 15 | 40 | 1.92 | None | 0 | 1.2 | 0 | (.78) |
| 16 | 50 | 2.40 | None | 0.10 | 1.4 | 0 | (.78) |
| 17 | 60 | 2.88 | None | 0.28 | 1.3 | (.5) | (1.3) |
| 18 | 70 | 3.37 | None | 0.9 | 1.1 | (.26) | (3.6) |

EXAMPLES 19-21

Example 8 was repeated except that Mondur MRS was replaced by equal isocyanate-equivalents of either a liquid modified polyisocyanate having an equivalent weight of 186 (Mondur M 323 available from Mobay Chemical Corp.) (Example 19), a liquid prepolymer of toluene diisocyanate and castor oil with an equivalent weight of 235 (TDI Prepolymer), (Example 20), or a liquid prepolymer of Mondur MRS and polypropylene glycol having a molecular weight of 2025 (PPG 2025 from Union Carbide) having an equivalent weight of 210 (Example 21). Results are presented in Table V.

TABLE V

| Ex. No. | Isocyanate Type | Surface Oiliness | Percent Weight Loss | | Percent Shrinkage | |
|---|---|---|---|---|---|---|
| | | | 125° F 24 Hrs. | 275° F 10 Min. | 125° F 24 Hrs. | 275° F 10 Min. |
| 19 | Mondur 323 | None | .49 | 1.4 | 0 | 0 |
| 20 | TDI Prepolymer | None | 1.4 | 3.4 | .78 | 2.1 |
| 21 | Mondur MRS Prepolymer | None | .8 | 1.7 | 0 | .52 |

EXAMPLES 22-26

Example 8 was repeated except that other well known urethane catalysts were used in place of N,N-dimethylcyclohexylamine catalysts, as shown in Table VI.

TABLE VI

| Ex. No. | Catalyst Type | Percent Loading | Surface Oiliness | Percent Weight Loss | | Percent Shrinkage (Expansion) | |
|---|---|---|---|---|---|---|---|
| | | | | 125° F 24 Hrs. | 275° F 10 Min. | 125° F 24 Hrs. | 275° F 10 Min. |
| 22 | Triethylamine | 0.3 | None | 0 | 1.2 | 0 | 0 |
| 23 | Dibutyltindilaurate | 0.5 | None | .55 | 1.3 | (.26) | (4.2) |
| 24 | Stannous Octoate | 0.8 | None | .83 | 1.5 | (1.3) | (3.6) |
| 25 | Lead Octoate | 0.8 | None | .53 | .85 | (.78) | (8.6) |
| 26 | Phenyl Mercuric Oleate | 4.0 | None | .41 | .93 | (1.0) | (4.2) |

EXAMPLE 27

A wood-patching composition was made by mixing the following ingredients, and then adding 25 parts of Mondur MRS for each 100 parts of the mixed ingredients:

| | Parts by Weight |
|---|---|
| Phenolic resin of Example 6 | 25.65 |
| Shell 293 | 34.20 |
| Kenplast G | 25.65 |
| Hollow glass microbubbles in a size range of 20 to 130 micrometers | 12.50 |
| Cab-O-Sil M5 (Silica from Cabot Corp.) | 1.70 |
| N,N-dimethylcyclohexylamine | 0.30 |

This composition was used to patch pre-routed knotholes and splits in the surface veneers of a 5-ply, ¾-inch-thick (1.9 centimeters) panel of douglas fir plywood.

After curing, the excess filler was removed by sanding. Phenolic-saturated, medium-density overlays were bonded to the panel surfaces in a platen press, using a temperature of 285° F (140° C) and a pressure of 200 pounds/sq. inch (14 kg/sq. centimeter) for 6 minutes. After the cured panel had cooled to ambient temperatures, the overlay over the repaired area was inspected and found to be essentially planar with the rest of the panel.

EXAMPLE 28

A wood-patching composition was made by mixing the following composition (water was emulsified into the oil to form a water-in-oil emulsion) and then adding 20 parts of Mondur MRS per 100 parts of the mixed ingredients:

|  | Parts by Weight |
|---|---|
| Phenolic resin of Example 8 | 19.92 |
| Shellflex 293 | 26.56 |
| Kenplast G | 19.92 |
| Water | 33.3 |
| N,N-dimethylcyclohexylamine | 0.3 |

This composition was used to patch routed knotholes in lumber. After curing, the lumber was shaped on a planar. Several pieces of lumber were patched and shaped in this manner. The cutting surface of the cutting tool was examined closely under a microscope for premature dulling, but none was observed.

EXAMPLE 28-29

Thirty parts of phenolic resin used in Example 6 were dissolved in a mixture of 30 parts Kenplast G oil and 40 parts Shellflex 293 oil. To this solution was added 0.3 part N,N-dimethylcyclohexylamine catalyst, either 20 parts of dioctylphthalate (Example 28) or 20 parts of polyester oil (Tenneco Adnerol 456 oil) (Example 29), and 30 parts of Mondur MRS. The resulting solutions were mixed until uniform and then poured into a 1.25 centimeter by 0.6 centimeter by 15 centimeter silicone mold. Results of tests on the cured product are reported in Table VII.

TABLE VII

| | | | Percent Weight Loss | | Percent (Shrinkage) | |
|---|---|---|---|---|---|---|
| Ex. No. | Ester Type and Percent | Surface Oiliness | 125° F 24 Hrs. | 275° F 10 Min. | 125° F 24 Hrs. | 275° F 10 Min. |
| 27 | Diocytl-phthalate 20% | Slight | 0 | 6.9 | 0 | 1.5 |
| 28 | Anderol 456 20% | None | 0 | .9 | .52 | .78 |

What is claimed is:

1. A curable composition of matter comprising
   a. an oil-soluble phenolic resin;
   b. polyisocyanate carrying on the average at least two isocyanate groups per molecule capable of reacting with hydroxyl groups on said phenolic resin to form a cured reaction product;
   c. a catalyst that promotes reaction between said isocyanate and hydroxyl groups; and
   d. petroleum oil comprising a blend of aromatic and paraffinic oils and included in an amount sufficient to dissolve said phenolic resin, polyisocyanate, and catalyst to a flowable form; the petroleum oil separating from said reaction product during the course of reaction as a uniform dispersion of minute droplets entrapped within the reaction product.

2. A composition of claim 1 in which said phenolic resin is prepared from alkyl-substituted phenol.

3. A composition of claim 1 in which said phenolic resin is prepared from phenol substituted in the para position by tertiary alkyl.

4. A composition of claim 3 in which said phenol is para-tertiary butyl phenol.

5. A composition of claim 1 in which said phenolic resin is a novolac resin.

6. A composition of claim 1 wherein the phenolic resin has repeated units of the formula:

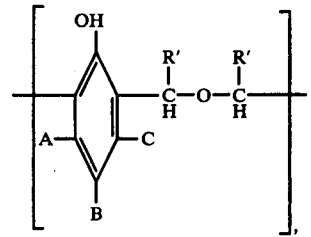

wherein A, B, and C are individually hydrogen or hydrocarbon radicals, and R' is a hydrogen or a hydrocarbon radical.

7. A composition of claim 1 in which said polyisocyanate is aromatic polyisocyanate.

8. A composition of claim 1 in which the phenolic resin and polyisocyanate are included in proportions that provide a ratio of isocyanate to hydroxyl groups of between about 0.8:1 and 3:1.

9. A composition of claim 1 which includes at least 50 weight-percent petroleum oil.

10. A composition of claim 1 in which between 50 and 80 weight-percent of said petroleum oil comprises aromatic ingredients.

11. A composition of claim 1 which further includes polar diluent ingredients in an amount up to 20 weight-percent of the composition.

12. A composition of claim 1 in which said catalyst is tertiary amine.

13. A composition of claim 1 extended with hollow microspheres.

14. A composition of claim 1 extended with water.

15. A method of patching a void in wood comprising filling the void with a composition of claim 1 and allowing the composition to cure.

16. A method for preparing a molded product comprising filling a mold with a composition of claim 1 and allowing the composition to cure.

17. A wood product having a recess filled with a cured composition of claim 1.

18. A molded product comprising a cured composition of claim 1.

19. A sheet product comprising a layer of cured composition of claim 1.

20. A cured composition of matter prepared by reacting a mixture that comprises
   a. an oil-soluble phenolic resin;
   b. polyisocyanate carrying on the average at least two isocyanate groups per molecule capable of reacting with hydroxyl groups on said phenolic resin to form a cured reaction product;
   c. a catalyst that promotes reaction between said isocyanate and hydroxyl groups; and c. petroleum oil comprising a blend of aromatic and paraffinic oils and included in an amount sufficient to dissolve said phenolic resin, polyisocyanate, and catalyst to a flowable form;

the petroleum oil being separated from said reaction product in the cured compsition as a uniform dispersion of minute droplets entrapped within the reaction product.

21. A curable composition of matter comprising
a. an oil-soluble phenolic resin prepared from alkyl-substituted phenol;
b. aromatic polyisocyanate carrying on the average at least two isocyanate groups per molecule capable of reacting with hydroxyl groups on said phenolic resin to form a cured reaction product;
c. a catalyst that promotes reaction between said isocyanate and hydroxyl groups; and
d. petroleum oil in an amount sufficient to dissolve said phenolic resin, polyisocyanate, and catalyst to a flowable form; said petroleum oil comprising a blend of aromatic and paraffinic oils, with the aromatic oils accounting for 50-80 weight-percent of the petroleum oil and the petroleum oil separating from said reaction product during the course of reaction to become dispersed a uniform dispersion of minute droplets entrapped within the reaction product.

22. A composition of claim 21 in which said phenolic resin is prepared from phenol substituted in the para position by tertiary alkyl.

23. A composition of claim 22 in which said phenol is para-tertiary butyl phenol.

24. A composition of claim 21 in which said phenolic resin is a novolac resin.

25. A composition of claim 21 wherein the phenolic resin has repeating units of the formula:

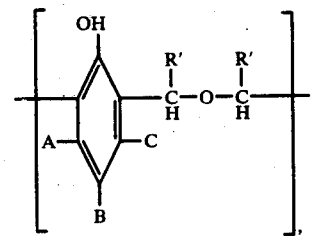

wherein A, B, and C are individually hydrogen or hydrocarbon radicals, and R' is a hyrogen or a hydrocarbon radical.

26. A composition of claim 21 in which the phenolic resin and polyisocyanate are included in proportions that provide a ratio of isocyanate to hydroxyl groups of between about 0.8:1 and 3:1.

27. A composition of claim 21 which includes at least 50 weight-percent petroleum oil.

28. A composition of claim 21 in which the catalyst is tertiary amine.

29. Method for patching a void in wood comprising filling the void with a composition of claim 21 and allowing the composition to cure.

* * * * *

UNITED STATES PATENT AND TRADEMARK OFFICE
CERTIFICATE OF CORRECTION

PATENT NO. : 4,048,103
DATED : September 13, 1977
INVENTOR(S) : Joseph Graham

It is certified that error appears in the above-identified patent and that said Letters Patent are hereby corrected as shown below:

In column 2, line 7, "through" should be --though--.

In column 2, line 22, "despersion" should be --dispersion--.

In column 11, line 32, --the-- should be inserted after "of".

In column 12, line 13, "repeated" should be --repeating--.

In column 13, line 27, "to become dispersed" should be deleted and --as-- should be inserted after "reaction".

Signed and Sealed this

Third Day of January 1978

[SEAL]

Attest:

RUTH C. MASON
*Attesting Officer*

LUTRELLE F. PARKER
*Acting Commissioner of Patents and Trademarks*